Oct. 20, 1942.    C. C. CALKINS    2,299,522
WEEDER
Filed March 26, 1941    2 Sheets-Sheet 1

Inventor:
Claude C. Calkins,
By Soans, Pond & Anderson
Attorneys.

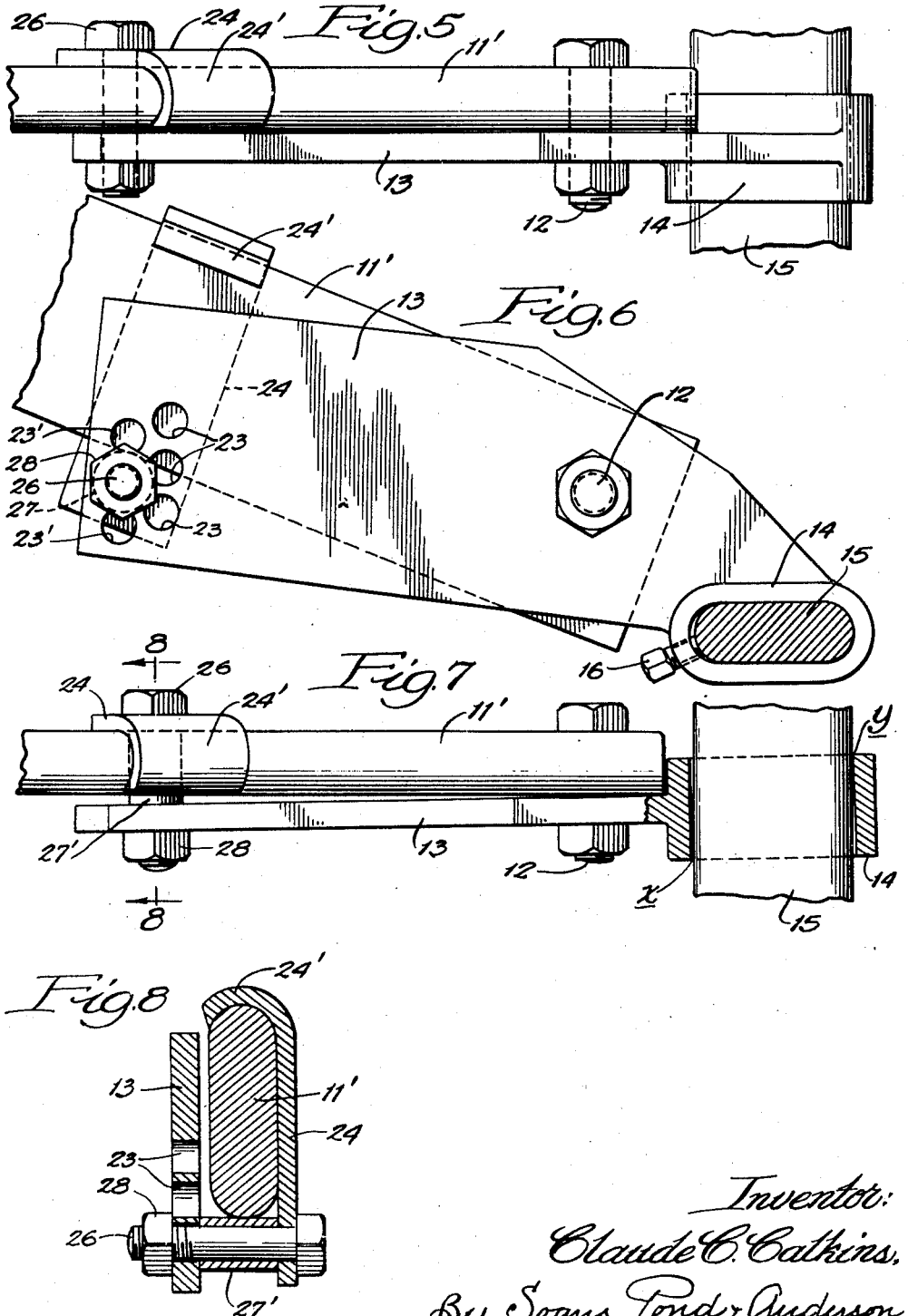

Patented Oct. 20, 1942

2,299,522

UNITED STATES PATENT OFFICE 2,299,522

WEEDER

Claude C. Calkins, Spokane, Wash.

Application March 26, 1941, Serial No. 385,236

10 Claims. (Cl. 97—42)

This invention relates to weeders preferably of the general type disclosed in my former Patents No. 1,818,532, August 11, 1931, and No. 1,910,881, May 23, 1933, wherein the weeding tool consists of a rod of square cross-section journaled in the lower ends of a gang of parallel longitudinal gooseneck beams and rotating in a backward direction relative to the direction of travel of the machine beneath the surface of the ground, to uproot and throw backward weeds, grain stubble, and the like.

When operating upon closely packed ground, it has been found to be a matter of some difficulty to force the weeder rod into the ground; and in a later development of these machines a bar has been mounted on and crosswise of bracket plates attached to the forward ends of the goosenecks, and a gang of closely adjacent shovels has been employed for breaking up the ground in advance of the rotary rod, said shovels being mounted on shanks which are bolted to said bar and extend across the weeder rod.

In this last mentioned type of machine, a considerable warping or twisting strain is imposed on the bar and bracket plates; and one object of my present invention has been to provide improved bracket plates and an improved mounting for the bar thereon which will better withstand this strain. Another object of the invention has been to provide an improved means for varying the angle at which the shovels enter the ground; and this improvement may be used either with, or independently of, the aforesaid improved mounting of the bar on the bracket plates.

A still further object of the present invention has been to provide an improved bracket plate which can easily be substituted for the bracket plates of machines now in use, without requiring any alteration in the goosenecks of such machines, thus saving the user of an old machine the expense of purchasing an entirely new rotary rod weeder embodying my present improvements.

Other objects and attendant advantages of the present invention will be apparent to persons skilled in the art from the following description of a practical and preferred embodiment thereof shown in the accompanying drawings, in which—

Fig. 5 is an enlarged top plan view showing the lower portion of the gooseneck, the bracket plate, a fragment of the bar mounted in a collar on the forward end of the bracket plate, and adjustable means for attaching the bracket plate to the gooseneck, by which the angular pitch of the shovels may be changed.

Fig. 6 is a side elevation of the parts shown in Fig. 5, viewed from the bottom of Fig. 5.

Fig. 7 is a top plan view, similar to Fig. 5, illustrating a modification.

Fig. 8 is a vertical section, similar to Fig. 3, taken on the line 8—8 of Fig. 7.

Figure 1:
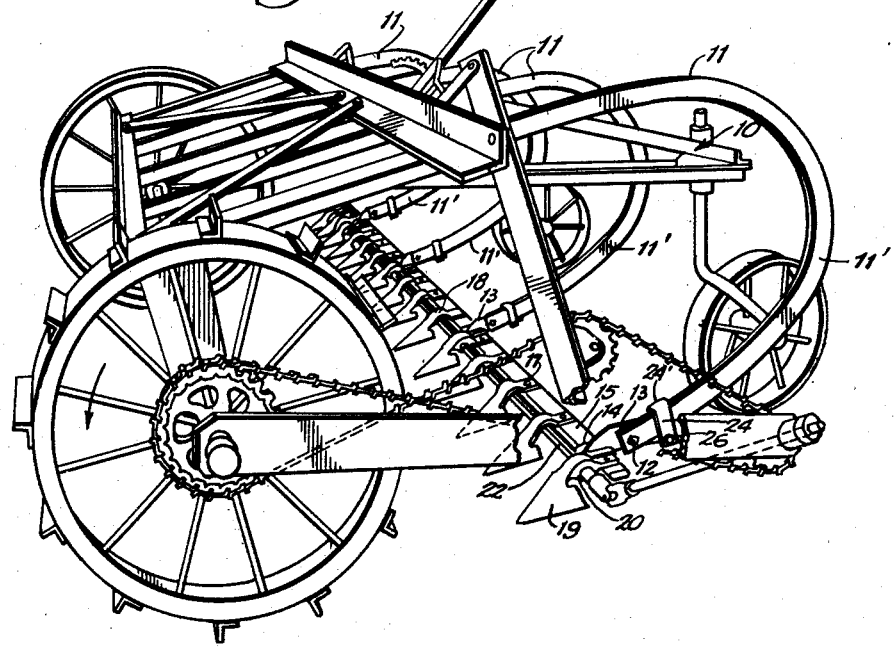
Fig. 1 is a perspective view, partly broken out on one side, of a rod weeder equipped with my present improvements.
Figure 2:
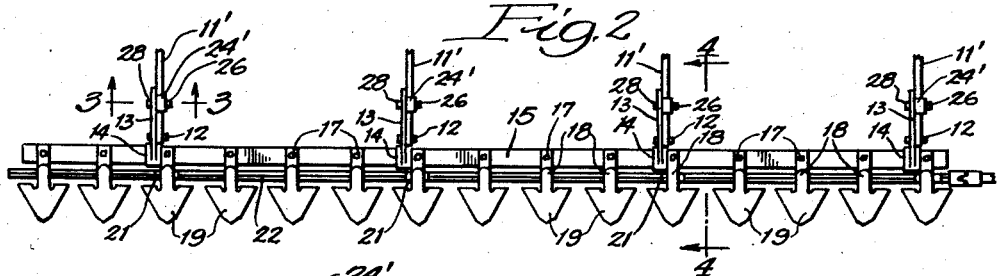
Fig. 2 is a top plan view of the ground-engaging elements of the machine shown in Fig. 1.

Referring to the drawings, in Fig. 1 I have shown in perspective a rod weeding machine embodying my present improvements, said machine including a frame structure designated as an entirety by 10, rigidly mounted in which frame are a gang of rearwardly extending parallel longitudinal beams 11, that terminate at their rear ends in depending gooseneck portions 11'.

Vertically mounted, as by a pivot bolt 12 on the forward end of each gooseneck 11' is a bracket plate 13. This bracket plate has, rigid with its forward end, a horizontally oblong collar 14 of considerably greater width than the plate 13. Collar 14 may be cast or forged integral with the plate 13, or it may be welded to the plate. Supported by the collars 14 of the several bracket plates is a bar 15 which fits the several collars sufficiently loosely to be slidable therethrough. In one form of invention, the bar 15 is locked against movement through the collar by a set screw 16 mounted in the rear end wall of the collar and biting the adjacent edge of the bar 15.

Attached to the bar 15 as by bolts 17 (Fig. 4) are the rear ends of the shanks 18 of a corresponding plurality of closely adjacent shovel plates 19.

Figures 3, 4:
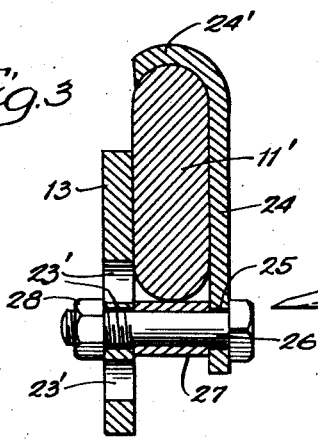
Fig. 3 is an enlarged vertical section taken on the line 3—3 of Fig. 2.
Fig. 4 is an enlarged cross-section taken on the line 4—4 of Fig. 2.

Certain of these shanks 18 are formed between the bar 15 and the shovel plates 19 with bearings 20 in which are journaled round portions 21 of the square rotary weeder rod 22. As shown in Fig. 4, the shovel shanks preferably are bolted to the upper side of the bar 15 and overlie the weeder rod 22.

Describing next the means for adjusting the bracket plates 13 in vertical planes, so as to adjust the angle at which the shovels enter the ground, and referring to Figs. 3, 5 and 6, in the rear end portion of the bracket plate 13 are formed two substantially vertical rows of closely spaced holes 23 and 23', the holes in one row being staggered relatively to those in the other, so as to secure comparatively fine adjustments. 24 designates a clip that, as shown in Fig. 3, lies against and crosswise of the side of the gooseneck 11' opposite that contacted by the bracket plate 13. This clip 24 is formed on its upper end with a hook 24' that overlies and hugs the top edge of the gooseneck 11', and in its lower end is a bolt hole 25. A clamp bolt 26 extends through the hole 25, a spacer sleeve 27, and any selected one of the holes 23 and 23' in the bracket plate 13; and to the projecting threaded end of the bolt 26 is applied a nut 28. It will be observed that the spacer sleeve 27 is tangent to the lower edge of the gooseneck 11' in all adjusted positions, so that the bracket plate 13 is securely held against tilting in a vertical plane when the adjustment has been made. In prior known constructions, the adjustment of the bracket plate has been made by a clamp bolt passed through a hole in one of the gooseneck and plate and an arcuate slot in the other; but, in practice, this has been found unsatisfactory for the reason that under the severe tilting strains on the bracket plate caused by the shovels, the clamp nut would work loose and allow the bracket plate to yield to the tilting strains. By my present improvement, the bracket plate 13 is positively locked against the possibility of tilting, since the clamp bolt 26 is engaged with holes in both the members 13 and 24, and the hook 24' prevents down movement of the rear end of the bracket plate and the spacer sleeve 27 and bolt 26 prevent up movement. Thus the bracket plate 13 is maintained rigid with the gooseneck in any and all adjusted positions.

Figs. 7 and 8 illustrate a slightly modified construction by which the collar 14 is itself caused to lock the bar 15 against endwise movement when the weeder is at work, thus dispensing with the necessity of the set screw 16. The only difference from the structure above described consists in the employment of a slightly longer spacer sleeve 27', which has the effect of slightly offsetting the rear end portion of the bracket plate 13 from the adjacent side of the gooseneck 11', thus causing the bracket plate 13 to lie at a small angle to the gooseneck 11' as clearly shown in Fig. 7. This, of course, gives a slight edgewise tilt to the collar 14, causing the diagonally opposite inner edges of its end walls to bite the opposite edges of the bar 15 at the points indicated by x and y in Fig. 7.

I have found by actual test that the above described improvements very substantially stiffen and strengthen the ground breaking elements (shovels 19) and their supporting and adjusting means, as compared with devices for the same purpose heretofore used. It will be evident that the foregoing improvements may be advantageously used on weeders which omit the rod, whether rotary or non-rotary, or on weeders wherein the rod may be mounted otherwise than as herein shown and described.

Variations and modifications in the details of structure and arrangement may, of course, be resorted to within the scope and coverage of the claims.

I claim:

1. In a weeder of the class described, having a gang of parallel longitudinal beams terminating at their rear ends in goosenecks, the combination of plates attached to and projecting forwardly of said goosenecks, collars rigidly mounted on the forward ends of said plates, a bar mounted in said collars crosswise of said goosenecks and plates, and a group of shovels having shanks attached to and extending forwardly of said bar.

2. In a weeder of the class described, having a gang of parallel longitudinal beams terminating at their rear ends in goosenecks, the combination of plates attached to and projecting forwardly of said goosenecks, collars rigidly mounted on the forward ends of said plates, a bar mounted in said collars crosswise of said goosenecks and plates, a group of shovels having shanks attached to and extending forwardly of said bar, and a weeding rod mounted parallel with said bar.

3. In combination with the subject-matter defined in claim 1, means for locking the bar against endwise movement through the collars.

4. In a weeder of the class described, having a gang of parallel longitudinal beams terminating at their rear ends in goosenecks, the combination of plates attached to and projecting forwardly of said goosenecks, horizontally oblong collars rigidly mounted on the forward ends of said plates, a bar slidable through and fitting said collars, a group of closely adjacent shovels having shanks attached to and extending forwardly of said bar, set screws mounted in the rear ends of said collars and bearing against the rear edge of said bar to lock the latter against endwise movement through said collars, and a weeding rod journaled parallel with said bar between the latter and said shovels.

5. In a weeder of the class described, having a gang of parallel longitudinal beams terminating at their rear ends in goosenecks, the combination of plates attached to and projecting forwardly of said goosenecks, horizontally oblong collars rigidly mounted on and crosswise of the forward ends of said plates, a bar slidable through and fitting said collars, a group of closely adjacent shovels having shanks attached to and extending forwardly of said bar, means for locking said bar against endwise movement through said collars consisting of means for attaching said plates at a small angle to said goosenecks whereby diagonally opposite inner edges of the ends of said collars are caused to bit the edges of said bar, and a rotary weeding rod journaled parallel with said bar between the latter and said shovels.

6. In a weeder of the class described having a gang of parallel longitudinal beams terminating at their rear ends in goosenecks, the combination of bracket plates horizontally pivoted on the forward end portions of said goosenecks and projecting forwardly of the latter, a bar mounted on and crosswise of the forward ends of said plates, a group of shovels having shanks attached to and extending forwardly of said bar, means for adjusting the rear ends of said plates vertically relatively to said goosenecks, whereby to vary the angle of said shovels relatively to the ground, said means comprising a substantially vertical row of closely spaced holes in each plate, a clip disposed crosswise of the opposite side of said gooseneck and formed with a hooked upper end overlying the top edge of the latter, a hole in the lower end of said clip, a spacer sleeve between said plate and clip tangent to the lower edge of said gooseneck, and a clamp bolt extending through said clip hole, said sleeve, and one of said row of holes, and a rotary weeding rod journaled parallel with said bar between the latter and said shovels.

7. In a weeder of the class described, having a gang of parallel longitudinal beams terminating at their rear ends in goosenecks, the combination of bracket plates horizontally pivoted on the forward end portions of said goosenecks and projecting forwardly of the latter, a bar mounted on and crosswise of the forward ends of said plates, a group of shovels having shanks attached to and extending forwardly of said bar, means for adjusting the rear ends of said plates vertically relatively to said goosenecks, whereby to vary the angle of said shovels relatively to the ground, said means comprising a plurality of substantially vertical rows of closely spaced holes in each plate, the holes of the several rows being staggered, a clip disposed crosswise of the opposite side of said gooseneck and formed with a hooked upper end overlying the top edge of the latter, a hole in the lower end of said clip, a spacer sleeve between said plate and clip tangent to the lower edge of said gooseneck, and a clamp bolt extending through said clip hole, said sleeve, and one of said plate holes.

8. An embodiment of the subject-matter defined in claim 6, wherein each of said bracket plates is formed on its forward end with a horizontally oblong collar in which the bar is mounted, and means are provided for locking said bar against endwise movement through said collar.

9. As a new article of manufacture, for use on rod weeders, a bracket plate formed on its forward end with a rigid collar to receive and fit a shovel-carrying bar.

10. As a new article of manufacture, for use on rod weeders, a bracket plate formed on its forward end with a rigid collar to receive and fit a shovel-carrying bar, and in its rear end portion with a plurality of vertically spaced holes, to receive an adjusting bolt.

CLAUDE C. CALKINS.